106-98

United States Patent Office 3,051,590
Patented Aug. 28, 1962

3,051,590
PROCESS FOR COATING BRICKWORK, MASONRY, CONCRETE AND WOOD AND COMPOSITIONS THEREFOR
Jacqueline Leonie Proux, 2 Rue Joseph-Sansboeuf, Paris (8e), France
No Drawing. Filed May 11, 1959, Ser. No. 812,143
Claims priority, application France Nov. 7, 1958
8 Claims. (Cl. 117—70)

This invention relates to the coating of fireclay and concrete products, such as various types of walls, ceilings, pavements, wood panels and the like, and generally to building and housing.

More particularly, this invention deals with the application of a coating composition which is to be exposed, to improve appearance, resistance to wear and tear, moisture penetration and otherwise produce a decorative and serviceable surface.

Such products have been hitherto coated with a ceramic glaze finish to produce a smooth, glossy, white or colored surface, but such a coating operation implies one or more special firings at a high or given temperature and is, therefore, expensive. Other types of coatings, such as ordinary paints and enamels, and in some cases, special paints, are applied to building materials, such as brick, concrete or wood and the like, but liquid coatings of this character are difficult to apply to produce a smooth finish, and either do not adhere properly or have to be frequently renewed.

One object of this invention is to provide a simple, inexpensive but effective coating for ceramic, cement, concrete, masonry, and wood products or the like, which permits a wide range of decorative effects, and produces a surface which is very durable and may be made similar in appearance to a ceramic glaze coating.

Another object of this invention is to provide a coating free from cracks, even if applied to wide areas, deriving from the fact that the product has little expansion or contraction after it has been laid.

A particular feature of this invention is that this coating can be advantageously carried out as an integral part of the manufacture of molded concrete or fireclay tiles into molds.

A still further object of the invention is to provide a coating which does not deteriorate under grease and acid action, is washable, rot-proof and fire-proof.

This invention relates to a coating obtained by the combined mixture of a liquid bonding agent and a dry bonding agent finely pulverized, the liquid bonding agent being used both as a primer and a final coat.

The liquid bonding agent is substantially formed by an aqueous suspension of calcium chloride, aluminum sulfate, urea and fatty sulfonate alcohol, in such proportions as to enable a rather quick setting.

The pulverized bonding agent, separately prepared, is substantially formed by a dry mix mixture, finely ground and screened, of asbestos, pumice stone, glass, lithopone, barium sulfate, white sand and commercial hydraulic cement.

Still further objects and advantages will appear in the more detailed description set forth below, it being, however, understood that this more detailed description is given by way of illustration and explanation only, and not by way of limitation, since various changes therein made be made by those skilled in the art without departing from the scope and spirit of the present invention.

The liquid bonding agent is first prepared, according to the following formulation, by weight:

| | |
|---|---|
| Calcium chloride | 19 |
| Aluminum sulfate | 3 |
| Urea | 10 |
| Fatty sulfonate alcohol (dispersant) | 1 |
| Water | 67 |
| | 100 |

The pulverized solid bonding agent, which will further act as a putty, when mixed with the liquid bonding agent, is separately prepared, according to the following formulation, by weight:

| | |
|---|---|
| Asbestos | 6 |
| Pumice stone | 2.5 |
| Glass | 7 |
| Lithopone | 3 |
| Barium sulfate | 3.5 |
| White sand | 38 |
| Commercial hydraulic cement | 40 |
| | 100 |

Any suitable coloring matter may be added to the pulverized solid bonding agent, in such a quantity as to obtain the final desired color and shade.

The surface to be coated is primed with a first layer of the said liquid bonding agent. After it has dried, a thin and pasty layer of putty, made of an intimately stirred up mixture of said liquid and pulverized bonding agents, is applied either with a brush, roller, spatula, or even a high pressure cement-gun, the thickness of which varies from $\frac{1}{24}$ to $\frac{1}{8}$ in. according to the use to which the coating is destined.

In order to obtain a smooth and polished surface, the putty can be rubbed down before it has completely hardened, a factor greatly depending upon the setting time of the cement used. Nevertheless, this operation is rarely necessary, for the components of the pulverized bonding agent are finely ground.

The coating is finally completed by applying two successive coats of the liquid bonding agent a few days later, say when the putty has greatly lost its dampness and reached a certain hardness.

I claim:
1. A method for coating a surface comprising the steps of applying to the surface a first primer consisting of a liquid bonding agent, said liquid agent consisting of an aqueous suspension comprising substantially, by weight, 19% calcium chloride, 3% aluminum sulfate, 10% urea, 1% fatty sulfonate alcohol, then allowing said first primer to set; thereupon, applying a layer of a pasty bonding agent consisting of a mixture of said first primer with a pulverized solid bonding agent comprising substantially by weight 6% asbestos, 2.5% pumice stone, 7% glass, 3% lithopone, 3.5% barium sulfate, 38% white sand and 40% hydraulic cement; allowing said solid bonding agent to harden; and thereupon, before said solid bonding agent has completely hardened, applying at least one coat of said first primer.

2. The method of producing a surfacing as claimed in claim 1, comprising further: rubbing down said pasty agent to a polished surface before said agent has hardened and before a final layer of said liquid agent is applied.

3. The article produced by the process of claim 1.

4. The article according to claim 3, in which said solid bonding agent contains coloring matter.

5. A process for coating a surface used for building and housing, comprising: applying onto said surface, a first layer of a bonding agent consisting of a liquid agent, then onto said first layer a second layer of a pasty agent, the latter being formed by mixing a finely pulverized solid agent with a proportion of said liquid agent, and onto said second layer a final layer consisting of said liquid agent, said solid agent being made of a finely pulverized mixture having substantially the following composition in parts by weight:

| | |
|---|---|
| Asbestos | 6 |
| Pumice stone | 2.5 |
| Glass | 7 |
| Lithopone | 3 |
| Barium sulfate | 3.5 |
| White sand | 38 |
| Commercial hydraulic cement | 40 |
| | 100 | and said liquid bonding agent, consisting of an aqueous suspension, having substantially the following composition in parts by weight:

| | |
|---|---|
| Calcium chloride | 19 |
| Aluminum sulfate | 3 |
| Urea | 10 |
| Fatty sulfonate alcohol | 1 |
| Water | 67 |
| | 100 |

6. A liquid bonding agent for coating solid surfaces consisting of an aqueous suspension having the following composition in parts by weight:

| | |
|---|---|
| Calcium chloride | 19 |
| Aluminum sulfate | 3 |
| Urea | 10 |
| Fatty sulfonate alcohol | 1 |
| Water | 67 |
| | 100 |

7. A solid bonding agent for coating solid surfaces consisting of a finely pulverized mixture having the following composition in parts by weight:

| | |
|---|---|
| Asbestos | 6 |
| Pumice stone | 2.5 |
| Glass | 7 |
| Lithopone | 3 |
| Barium sulfate | 3.5 |
| White sand | 38 |
| Commercial hydraulic cement | 40 |
| | 100 |

8. A bonding agent according to claim 7 mixed with a proportion of a liquid bonding agent having the following composition in parts by weight:

| | |
|---|---|
| Calcium chloride | 19 |
| Aluminum sulfate | 3 |
| Urea | 10 |
| Fatty sulfonate alcohol | 1 |
| Water | 67 |
| | 100 | said proportion being such that the mixture forms a pasty bonding agent.

References Cited in the file of this patent

UNITED STATES PATENTS

| | | |
|---|---|---|
| 1,160,708 | Goulocher et al. | Nov. 16, 1915 |
| 1,830,872 | Ellis | Nov. 10, 1931 |
| 1,874,170 | Chapman | Aug. 30, 1932 |
| 2,575,599 | Silverman et al. | Nov. 20, 1951 |
| 2,728,686 | Borushko | Dec. 27, 1955 |
| 2,901,377 | Bode | Aug. 25, 1959 |